A. F. ROCKWELL.
ANTIFRICTION BEARING.
APPLICATION FILED MAY 10, 1906.
921,464.
Patented May 11, 1909.
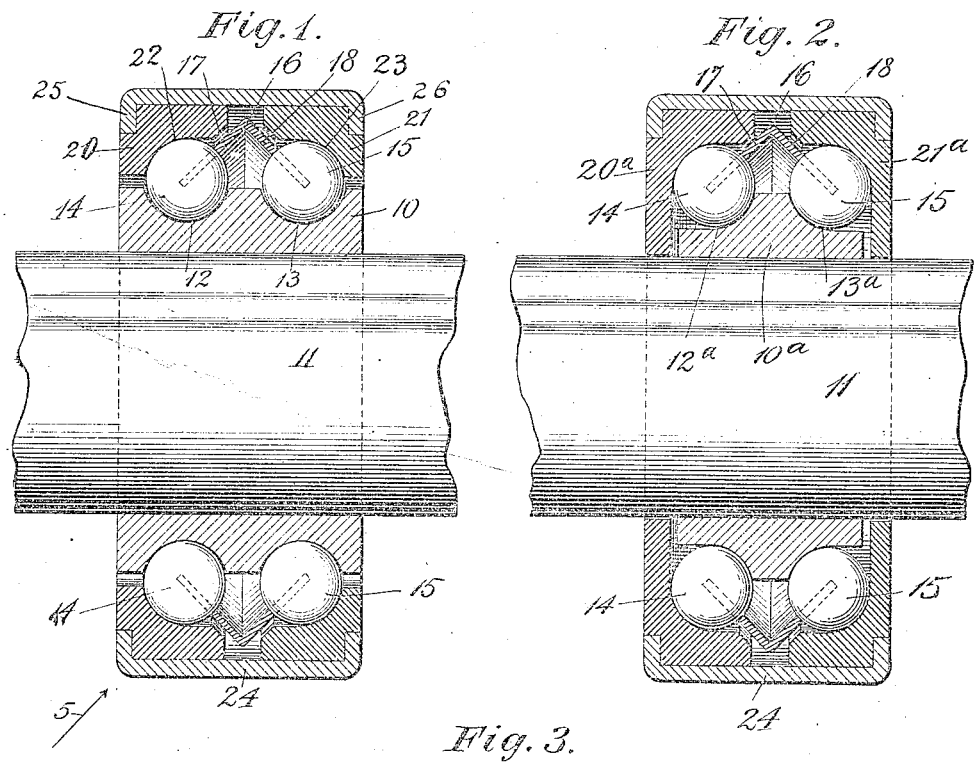
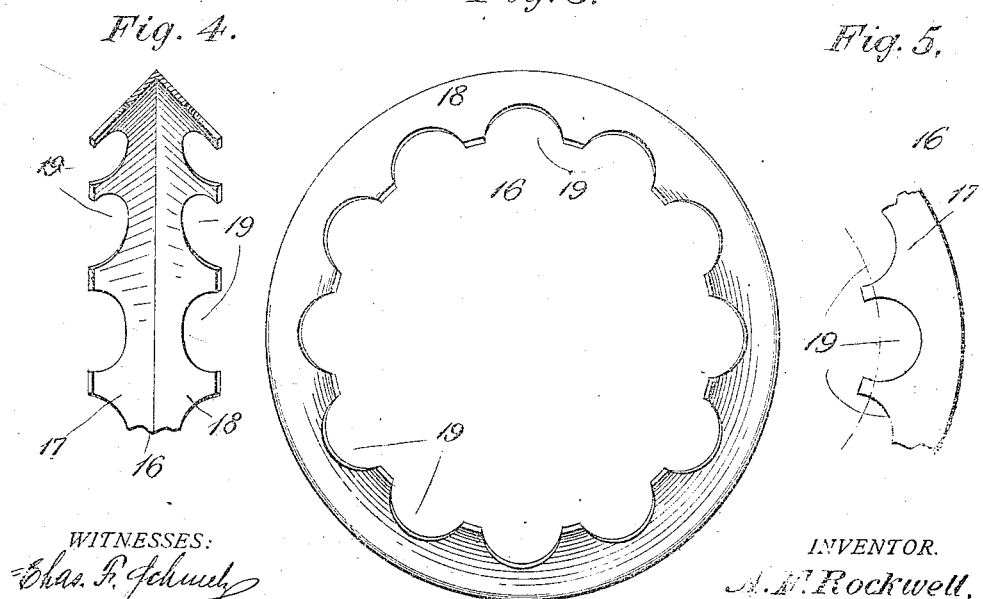

UNITED STATES PATENT OFFICE.

ALBERT F. ROCKWELL, OF BRISTOL, CONNECTICUT, ASSIGNOR TO THE NEW DEPARTURE MANUFACTURING COMPANY, OF BRISTOL, CONNECTICUT, A CORPORATION OF CONNECTICUT.

ANTIFRICTION-BEARING.

No. 921,464.   Specification of Letters Patent.   Patented May 11, 1909.

Application filed May 10, 1906. Serial No. 316,166.

*To all whom it may concern:*

Be it known that I, ALBERT F. ROCKWELL, a citizen of the United States, residing at Bristol, county of Hartford, State of Connecticut, have invented a certain new and useful Antifriction-Bearing, of which the following is a full, clear, and exact description, such as will enable others skilled in the art to which it appertains to make and use the same, reference being had to the accompanying drawings, forming part of this specification.

My invention relates to anti-friction bearings and is particularly applicable to such bearings of the self-contained type, i. e., those which can be manufactured and shipped as a complete, assembled article and can then be placed in position (e. g., between a wheel and its axle) without disturbance of the parts of which the bearing itself is composed.

In an anti-friction bearing it is highly important that the cone member and the cup member have no play or wabbling motion with respect to each other, for if such motion exists the wheel or other device provided with the bearing will not run true and many well known disadvantageous results follow.

One object of the present invention is to provide a bearing in which the cone member and cup member are firmly held with respect to each other so that the above mentioned undesirable play or wabbling is avoided while at the same time the friction between the cone-member and cup member is reduced to the minimum or entirely eliminated to permit free and easy running movement between the devices provided with the bearing.

A further object is to provide a bearing having the very advantageous features just above recited, the bearing being of such character that the said desired features can be secured even though the separate elements of the bearing may not be perfectly accurately-formed, thus making possible the inexpensive production of a bearing having its elements properly adjusted to give the before mentioned rigidity and easy running.

A further object is to provide a simple, strong and efficient spacer for the anti-friction members.

To these ends, and also to improve generally upon devices of the character indicated, my invention consists in the various matters hereinafter described and claimed.

In the accompanying drawings: Figure 1 is a cross sectional view through the preferred embodiment of my invention; Fig. 2 is a similar view illustrating a modification; Fig. 3 shows the spacer in side elevation; Fig. 4 is a fragmentary, interior view of the spacer; and Fig. 5 is a fragmentary view of the spacer, looking in the direction of the arrow 5 of Fig. 1.

Referring now more particularly to the drawings, and at this time to the embodiment of the invention illustrated in Fig. 1 thereof, 10 represents the cone member of the bearing, the parts 20 and 21 with their connecting casing 24 constitute the cup member thereof, and the anti-friction elements received between and coöperating with said cone and cup members are indicated by the balls 14 and 15. In the embodiment here shown the cone member consists of a cylindrical sleeve adapted to be secured in a well understood manner to a shaft 11 or other appropriate device to which the bearing is to be applied, said sleeve having two parallel, peripheral, annular race-ways 12 and 13 produced by grooves curved in cross-section and struck upon a radius greater than the radius of the balls 14 and 15 which are received in said race-ways.

The cup elements 20 and 21, are preferably similar to each other, and, in that embodiment of the invention now under consideration, each of them is a ring having a race-way upon its inner side, these race-ways 22 and 23 being here shown as curved and such curves having a radius greater than the radius of the balls. Thus each ball finds a seat at one point upon a cone race-way and at another point upon the race-way of the coöperating cup, and the cups are so placed with relation to the cone member that the line including the two said points of bearing of any ball is oblique to the radial line of the complete bearing (said radial line being the vertical axis as the bearing is illustrated in Fig. 1), whereby the bearing is, in a well understood manner, capable of withstanding end thrusts as well as radial load. The said cup rings 20 and 21 are spaced from each other for a purpose to be hereinafter explained.

I am aware that I am not the first to devise a ball-bearing including a central sleeve having parallel, peripheral annular raceways, cup-rings coöperating with said raceways, and balls between said respective cups and their coöperating race-ways of said sleeve, said cups being so placed with relation to said sleeve that both end thrust and radial load are provided for. But my invention differentiates from these previous structures in the features which, as will be more fully hereinafter explained, make it possible to produce my bearing at a sufficiently low cost to make it a commercial article and yet enable the bearing to have the above mentioned necessary rigidity between the cone member and the cup member together with the equally essential free running of said members with respect to each other.

In my structure, at least one of the before mentioned cups (20 and 21) can, under proper endwise pressure, freely slide into the casing 24 before mentioned, there being no threads or other elements to interfere with such free sliding. Therefore, when assembling the bearing (all of the parts except one of the cups (e. g., 21) being in approximately final position), said cup 21 can be pressed toward its row of balls 15 and when it meets such balls the latter in turn press against the sleeve 10, forcing the sleeve against the second set of balls 14 and thus forcing said balls against the race-way of the cup 20. The cup 20 being in final position with respect to the casing 24, the before mentioned pressure causes the balls 14 to find their proper seats upon the race-ways 22 and 12, even though the parts may not have been quite accurately ground, and such pressure also causes the balls 15 to properly seat themselves upon their race-ways 13 and 23, the cup 21, unrestricted by threads or other obstructions upon the casing, sliding as much or as little as necessary in the casing and adjusting itself to its seat upon the balls 15. The cup 20 being held in position by the casing flange 25 and the flange 26 being produced at the opposite end of the casing, the parts are locked in adjusted positions. Thus, even when the balls and their race-ways are not quite accurately ground (and absolutely accurate grinding is practically unknown in commercial machine work), the above mentioned free sliding permitted between at least one of the cups and the casing enables the said cups as well as the balls and the cone member to so adjust themselves in the assembling of the bearing that, each set of balls is firmly seated upon the cone member 10 and is also firmly seated upon the cups 20 and 21 of the cup member. The casing serving to hold the elements of the cup member together as a single piece and the cone member being, in the illustrated construction, a single piece, each of said cone and cup members has its position determined by the two points at which each engages the balls in any line, so that the before mentioned desired and highly essential rigidity between the cone and cup members is secured in a practical, inexpensive and efficient manner and play between the cone and cup members is avoided. Nevertheless, each ball has only a two point bearing (one on the cone and the other on the cup) so that free running movement between the cone member and the cup member is secured. It is very advantageous that the casing should be bendable at that end which is to hold the cup upon which pressure is applied in the above mentioned illustration of assembling and adjusting (i. e., the end which produces the flange 26 as mentioned in said illustration), for under such conditions the said flange 26 can be produced by spinning the end of the casing over the edge of the cup 21. This spinning not only serves to press the cup 21 inwardly with even pressure applied successively throughout the whole circle of the cup, but it also simultaneously produces the holding flange 26 so that as the cup 21 is advanced into its adjusted position it is also properly held in such position.

In the modified structure illustrated in Fig. 2 the general arrangement of the bearing is that previously described and the various elements are similar to those illustrated in Fig. 1 except that the sleeve 10$^a$ is somewhat shorter than the sleeve 10, so that said sleeve 10$^a$ can be received between the elongated face webs of the cups 20$^a$ and 21$^a$, the race-ways 12$^a$ and 13$^a$ being open upon their outer sides as shown.

The bearing is preferably provided with suitable means for spacing the anti-friction members, such means herein shown being the spacer 16. The spacer here illustrated consists of a ring which is angular in cross-section, the wings 17 and 18 of said ring diverging from each other and toward the balls. Each wing has recesses or pockets 19 in its free or outer edge to receive the balls and hold the latter properly spaced. Each wing receives one series of balls, so that said spacer is wholly supported upon said balls, whereby all friction between said spacer and any other portion of the bearing is eliminated. The fact that the wings 17 and 18 diverge from each other and are angularly disposed gives the spacer a shape approximating an arch, whereby the spacer is given ample strength to withstand strains, and such shape also permits the angle of the spacer to be received and to run freely in the space between the cups 20 and 21.

Preferably, as shown in Fig. 5, each ball-receiving recess 19 of the separator is greater than a semi-circle so that the recess presents a finger at each side of each ball, such finger extending beyond the diameter of the ball, as shown in Fig. 1, and curving inwardly toward the ball beyond such diameter. Thus, the separator is prevented from moving outwardly radially with respect to its proper assembled position. Furthermore, the point of contact between a ball and the separator is, as shown in Fig. 1, about half way between the top and bottom bearing points of the ball, so that the said point of contact is in the axis of rotation of the ball and any friction between a ball and the separator is reduced to the minimum.

Thus, in my bearing efficient means are provided for spacing the anti-friction members, and it is possible to inexpensively produce, even from elements not perfectly accurately ground, a self-contained bearing having both the desired rigidity and free running movement between the cone and cup members.

Having thus described my invention, what I claim as new and desire to secure by Letters Patent is:

1. A ball-bearing comprising a cone member having two parallel ball-races, two ball cups spaced from each other and each provided with a ball-race coöperating with one of said first mentioned ball-races, a series of balls between each set of said coöperating ball-races, the balls of each series having a one-point bearing upon each of the races in which such balls are received and the bearing points upon coöperating races being in a line oblique to the radial line of the bearing as a whole, a casing receiving said ball-cups and free from obstructions to the free sliding of one of said cups upon said casing toward the other said cup, said casing having a bendable portion which overlaps the edge of said freely slidable cup, and means for holding the other said cup against movement upon said casing; substantially as described.

2. An anti-friction bearing comprising a cone member having two parallel races, two cups spaced from each other and each provided with a race coöperating with one of said first mentioned races, a series of anti-friction devices between each set of said coöperating races, a casing receiving said cups and free from obstructions to the free sliding of one of said cups upon said casing toward the other said cup, said casing having a bendable portion which overlaps the edge of said freely slidable cup, and means for holding the other said cup against movement upon said casing; substantially as described.

3. A ball-bearing comprising a cone member having two parallel ball-races, two ball cups spaced from each other and each provided with a ball-race coöperating with one of said first mentioned ball-races, a series of balls between each set of said coöperating ball-races, the balls of each series having a one-point bearing upon each of the races in which such balls are received and the bearing points upon coöperating races being in a line oblique to the radial line of the bearing as a whole, a casing receiving said ball-cups and free from obstructions to the free sliding of one of said cups upon said casing toward the other said cup, said casing having a bendable portion which overlaps the edge of said freely slidable cup, means for holding the other said cup against movement upon said casing, and a spacer comprising an annulus having angularly disposed wings which diverge toward opposite sides of the diameter of said annulus and are provided in their edges with pockets which receive said balls, each of said pockets being greater than a semi-circle whereby fingers are presented which extend beyond the diameter of the balls and curve toward said balls to retain the annulus in position, said annulus resting upon each ball in substantially the axis of rotation of the ball; substantially as described.

4. The combination of a cone member having ball-races, balls in said races, spaced cup elements having races engaged by said balls, means for connecting said cup elements together, and a ball spacer comprising an annulus having diverging wings which engage said balls at points about midway between the top and bottom of each ball, the intermediate portion of the spacer extending outwardly from said balls and interposed between the spaced cup elements; substantially as described.

5. A spacer for anti-friction members, said spacer comprising an annulus having connected and angularly disposed wings which diverge toward opposite sides of the diameter of said annulus and are provided with pockets for receiving the anti-friction members; substantially as described.

In testimony whereof, I hereunto affix my signature, in the presence of two witnesses.

ALBERT F. ROCKWELL.

Witnesses:
JOSEPH D. BROWN,
CLARA H. VOORHEES.